See RE 28081
Oct. 27, 1970     J. E. TRAVIOLI     3,536,894
ELECTRONIC CREDIT CARD ACCEPTOR
Filed July 23, 1965     4 Sheets-Sheet 1
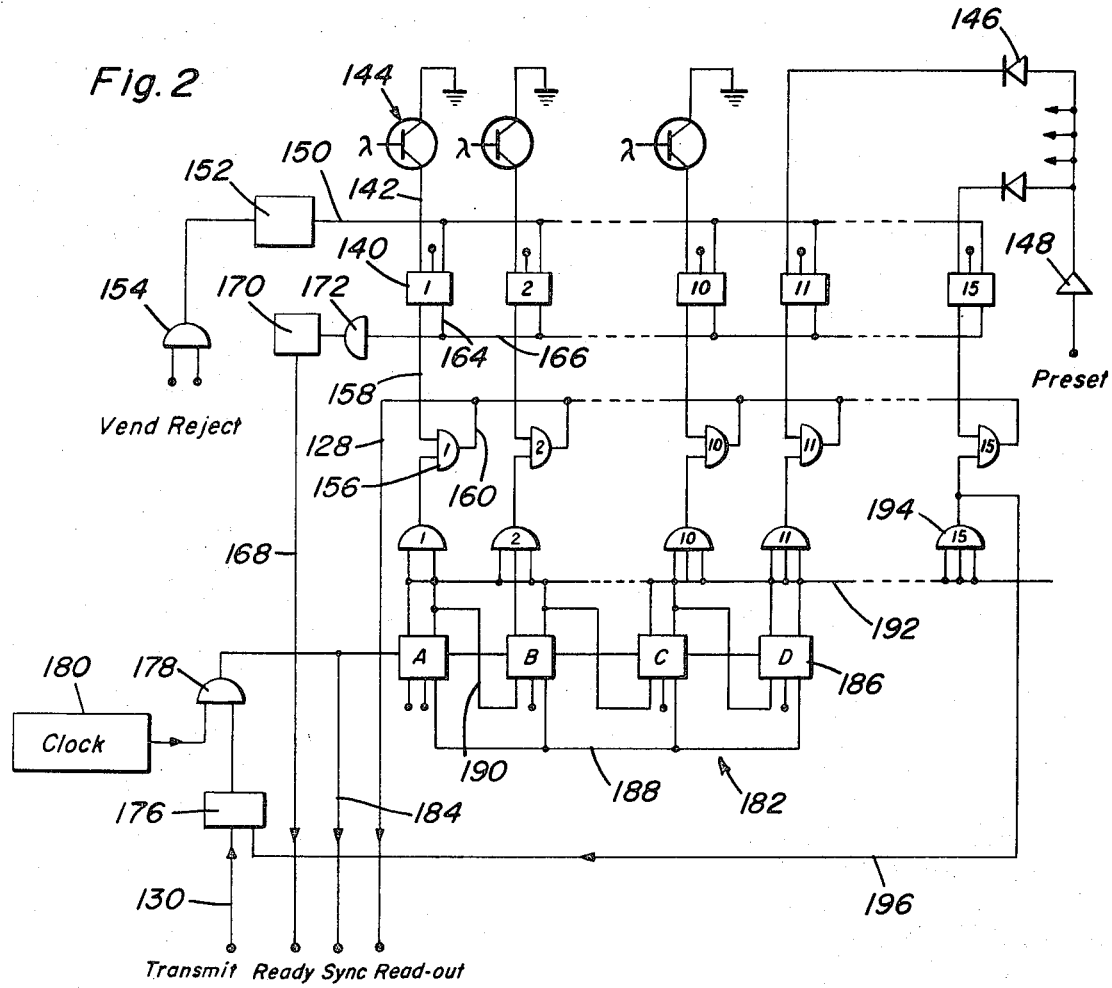
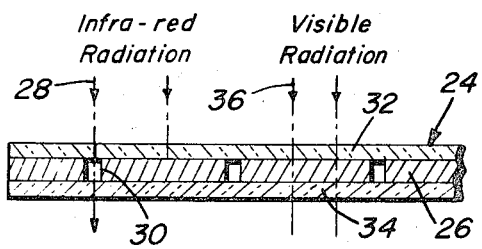
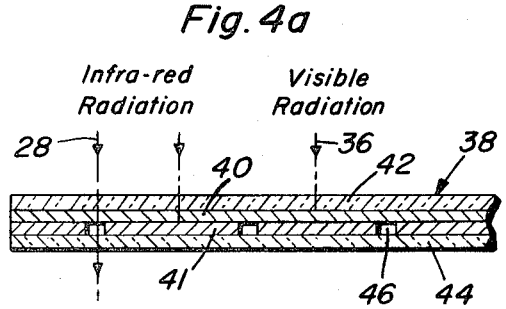
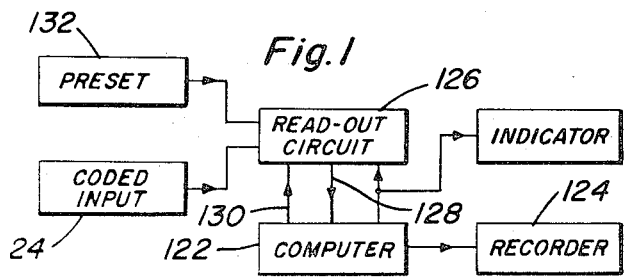
Jerry E. Travioli
INVENTOR.

Oct. 27, 1970   J. E. TRAVIOLI   3,536,894
ELECTRONIC CREDIT CARD ACCEPTOR
Filed July 23, 1965   4 Sheets-Sheet 2
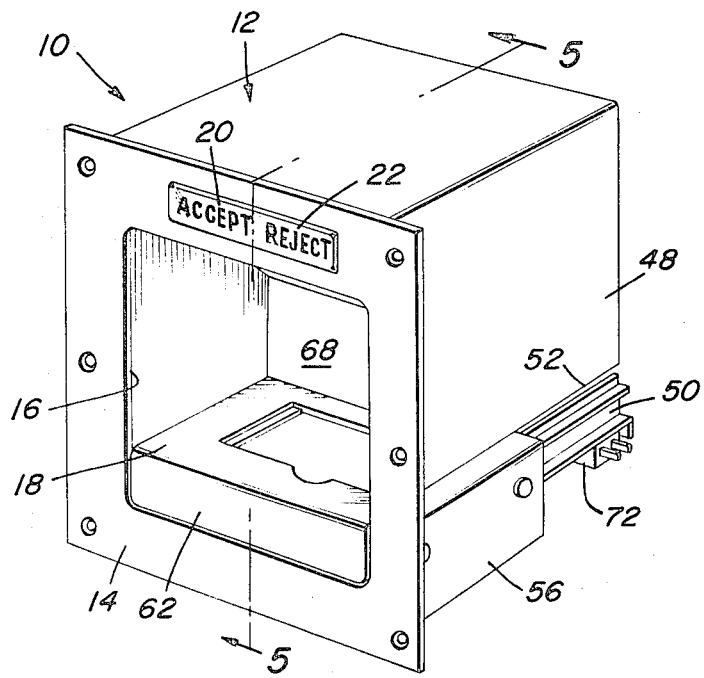
Fig. 3
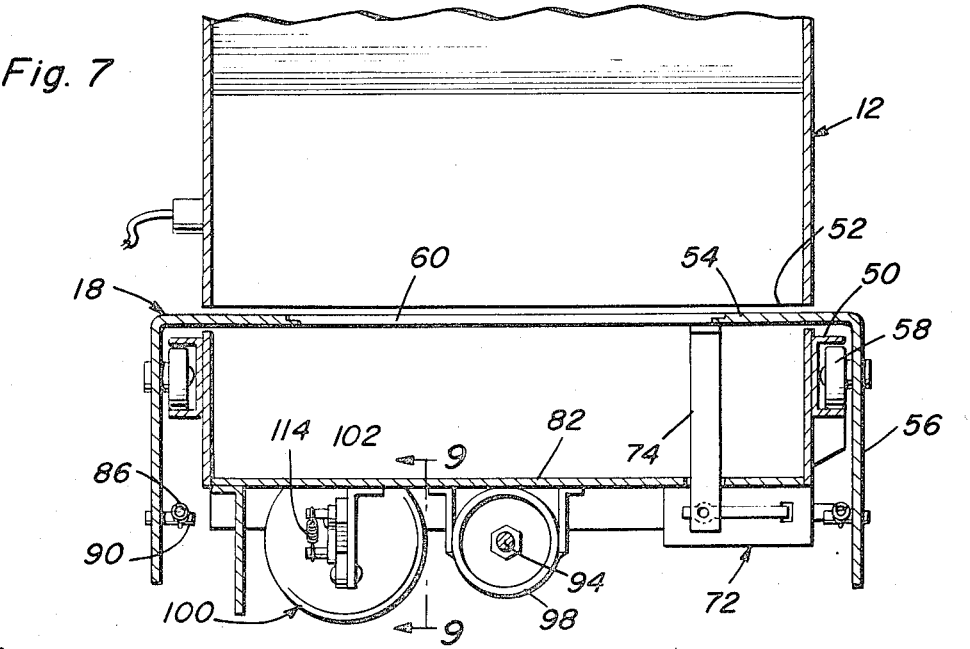
Fig. 7
Fig. 9
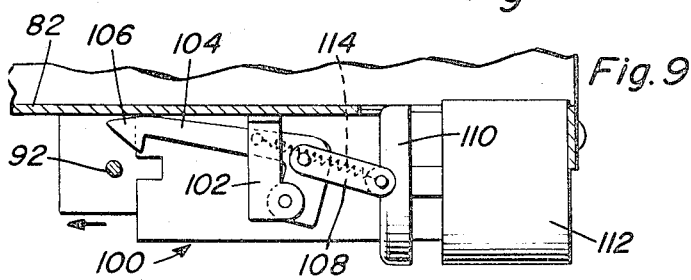
Jerry E. Travioli
INVENTOR.

Oct. 27, 1970      J. E. TRAVIOLI      3,536,894
ELECTRONIC CREDIT CARD ACCEPTOR
Filed July 23, 1965      4 Sheets-Sheet 3
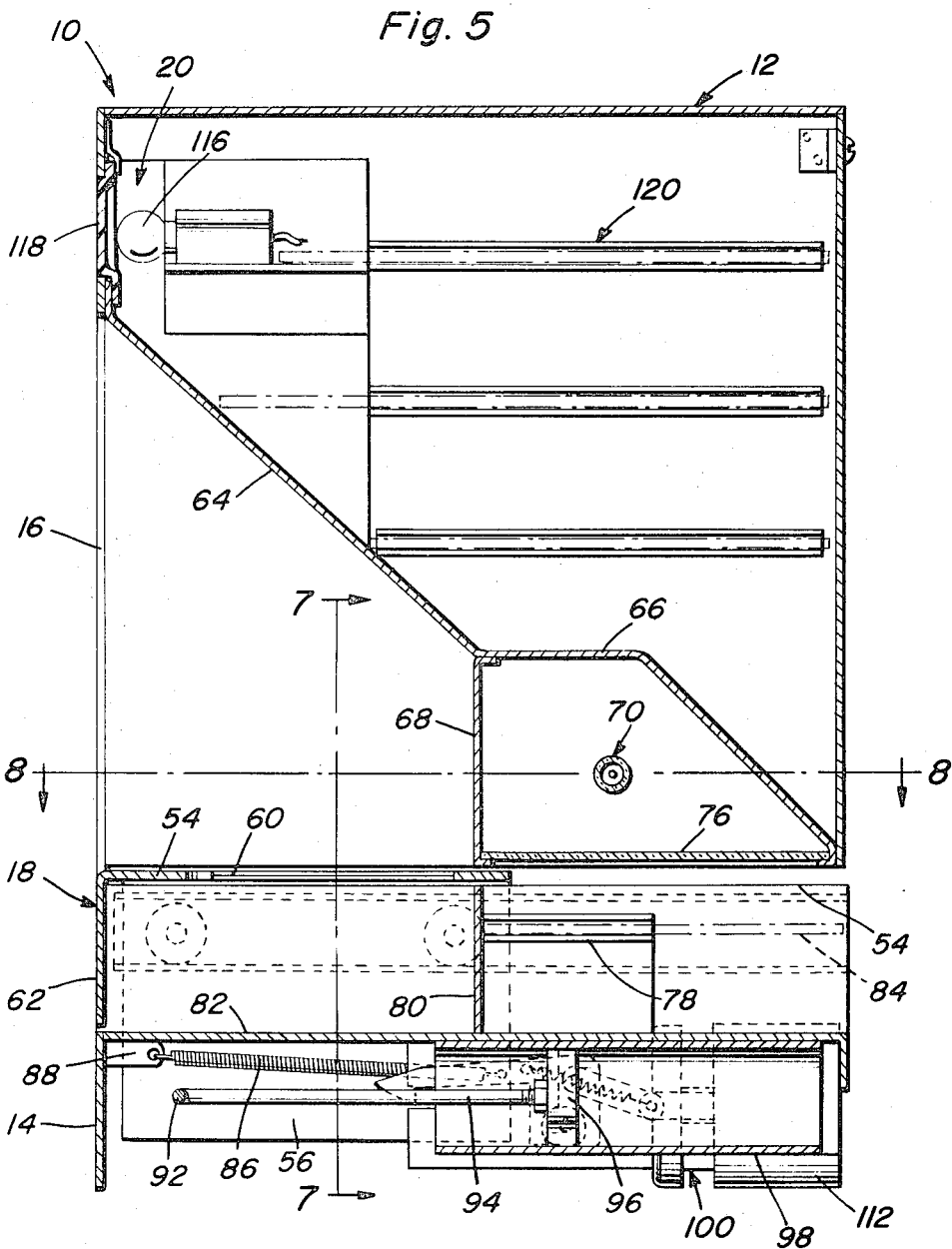
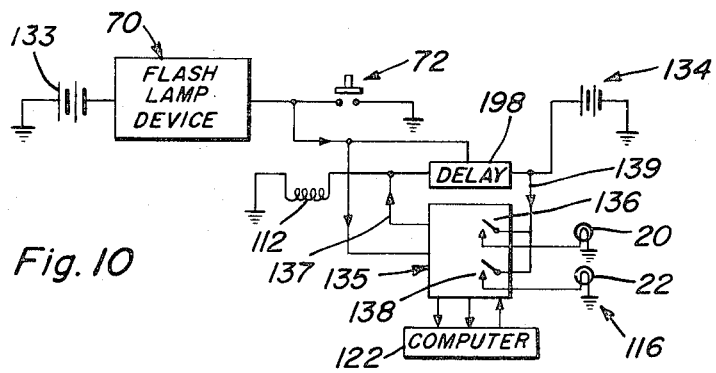
Jerry E. Travioli
INVENTOR.
BY Clarence A. O'Brien
and Harvey B. Jacobson
Attorneys Oct. 27, 1970 J. E. TRAVIOLI 3,536,894
ELECTRONIC CREDIT CARD ACCEPTOR
Filed July 23, 1965 4 Sheets-Sheet 4
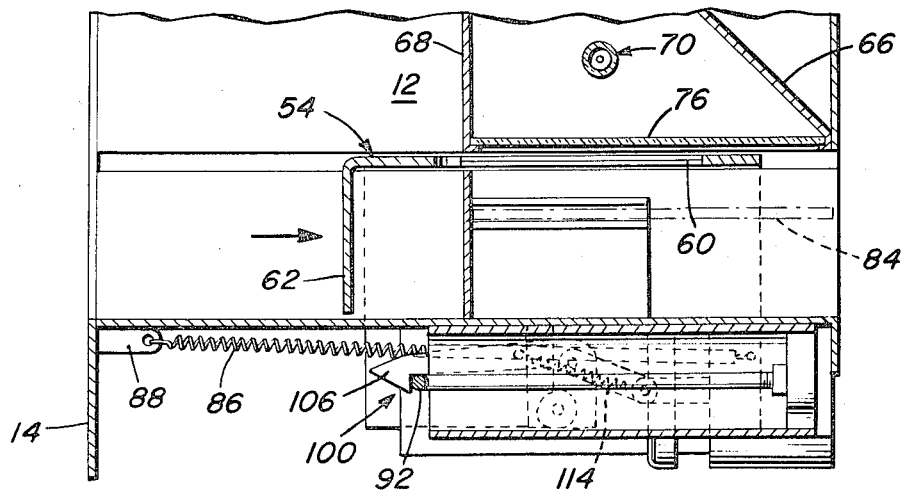
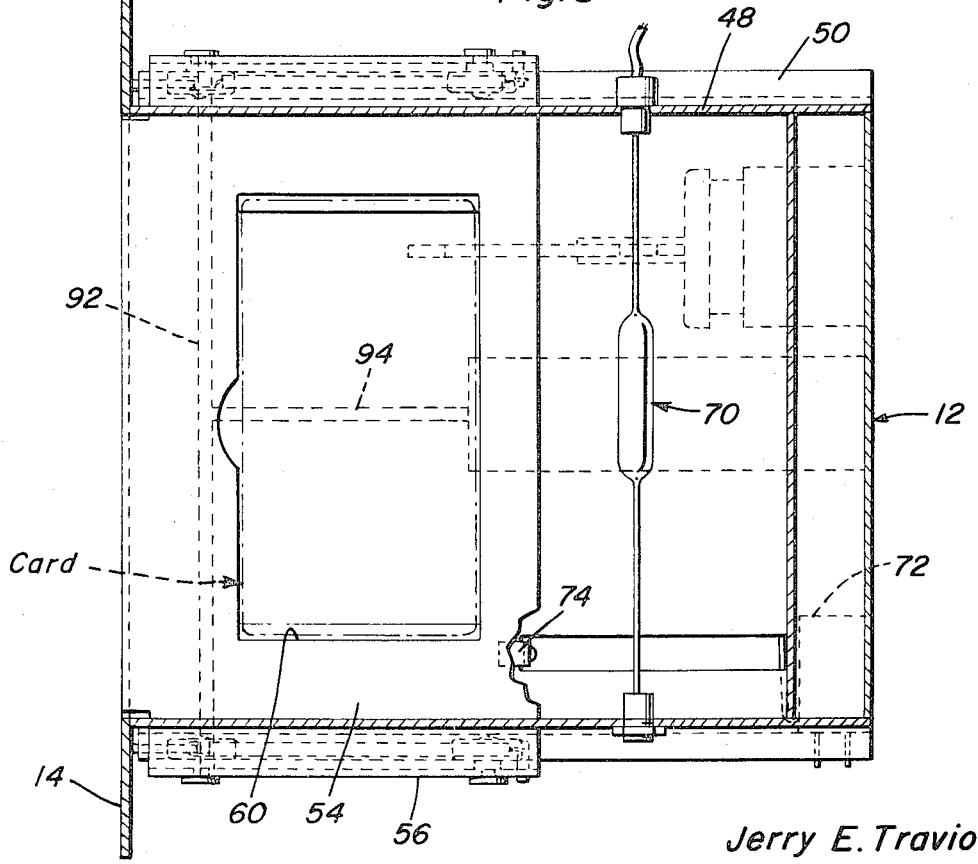
Jerry E. Travioli
INVENTOR.
BY Clarence A. O'Brien
and Harvey B. Jacobson
Attorneys

United States Patent Office 3,536,894
Patented Oct. 27, 1970

3,536,894
ELECTRONIC CREDIT CARD ACCEPTOR
Jerry E. Travioli, 1022 Valley, Visalia, Calif. 93277
Filed July 23, 1965, Ser. No. 474,239
Int. Cl. G01n 21/30; G06k 7/12; H04q 1/20
U.S. Cl. 235—61.6                                    5 Claims

ABSTRACT OF THE DISCLOSURE

Apparatus for rapidly determining the credit of a person bearing a credit card by means of a credit checking computer wherein the credit card incorporates infra red transmitting portions for transmitting infra red radiation emitting from an infra red radiation source to reading means producing signal pulses which are fed to the computer, and the computer produces output signals indicating the credit condition pertaining to the card read.

---

This invention relates to apparatus for rapidly checking the credit condition of a person bearing a credit card or the like having coded information thereon.

It is therefore a primary object of the present invention to provide an electronically operated device adapted to accept an especially prepared credit card so that the credit condition of a person may be checked out by a computer in connection with given sales or purchase information. After the credit condition is checked, the device of the present invention will then be operative to return the credit card to the person and signal either the acceptance or rejection of the person's credit in connection with the sales information for which the computer is programmed.

An important object of the present invention therefore, is to provide a device adapted to accept a credit card so that the coded information thereon may be rapidly and reliably read out and fed to a computer. The device of the present invention will therefore be useful in connection with the reading of coded information on various types of credit cards such as American Express and Diner Club cards, air travel credit cards, etc.

An additional object of the present invention is to provide a credit card read-out device utilizing infra red radiation to detect the presence of coded information on the credit card while it is exposed in a stationary position to infra red radiation. All of the coded information on the credit card is thereby read in at the same time to a read-out circuit after which the information is sequentially fed to the computer with which the device is associated. Accordingly, the device of the present invention involves a relatively short operational cycle which may be repeated as many times as desired within a practical period of time in order to recheck the credit information fed into the computer.

A still further object of the present invention is to provide a credit card read-out device and a specially constructed credit card in association therewith which would make it virtually impossible for unauthorized persons to reproduce the coded information on the credit card.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a block flow diagram illustrating the overall system of the present invention.

FIG. 2 is a simplified electrical circuit diagram associated with the credit card acceptor device for handling the coded information.

FIG. 3 is a perspective view of the credit card acceptor device.

FIG. 4 is an enlarged partial sectional view through one form of credit card constructed in accordance with the present invention.

FIG. 4a is an enlarged partial sectional view through a modified form of credit card constructed in accordance with the present invention.

FIG. 5 is a sectional view through the credit card acceptor taken substantially through a plane indicated by section line 5—5 in FIG. 3.

FIG. 6 is a partial sectional view of a portion of the credit card acceptor shown in FIG. 5 in another operative condition.

FIG. 7 is a partial sectional view taken substantially through a plane indicated by section line 7—7 in FIG. 5.

FIG. 8 is a sectional view taken substantially through a plane indicated by section line 8—8 in FIG. 5.

FIG. 9 is a partial sectional view taken substantially through a plane indicated by section line 9—9 in FIG. 7 but showing this portion of the credit card acceptor in another operative condition.

FIG. 10 is a simplified electrical circuit diagram illustrating the operational controls.

Referring now to the drawings in detail, and initially to FIG. 3, it will be observed that the credit card acceptor is generally denoted by reference numeral 10 and includes a housing enclosure generally referred to by reference numeral 12 adapted to be mounted at any suitable location by means of a front mounting frame 14, to which the housing enclosure is connected. The front mounting frame defines an opening 16 within which a card receiving tray member 18 is exposed. Also mounted by the housing enclosure and projecting through the front mounting frame 14, is a credit indicator including a pair of indicating signal lamps 20 and 22 respectively illuminated to either register acceptance or the rejection of the credit of a person bearing the credit card being checked through the credit card acceptor.

The credit cards handled by the device of the present invention would contain information including a customer's account number such as the customer's social security number and the date of issue of the credit card. In addition to the account number, authentication coding and card type coding could be carried by the card in the forming of binary bits. Also, the card may contain a check number so that the reading of the card information could be verified. The computer with which the device is associated may therefore be operative to signal the acceptor if the card number is not verified in order to retransmit the information to the computer. The coded information on the credit card would be established by the discreet punching of holes through which radiation may pass. Referring therefore to FIG. 4, it will be observed that one form of credit card generally referred to by reference numeral 24 includes a thin center layer 26 of material such as cellophane which is transparent to light or radiation in the visible spectrum but opaque to infra red radiation. Accordingly, infra red radiation as indicated by the arrows 28 will pass only through the holes 30 punched in the center layer. The center layer 26 would also be sandwiched between relatively rigid outer layers 32 and 34 which are translucent so that light such as indicated by the arrows 36 may pass through all areas of the card. Accordingly, when the credit card is subjected to radiation from an infra red source, it will pass through the credit card in accordance with a coded pattern determined by a combination of holes 30 between the outer layers 32 and 34. Therefore, altering of the coded information on a credit card will be made difficult, because of the concealment of the coded holes 30 and the infra red opaque layer 26 between the outer layers 32 and 34. Alternatively, a modified form of credit card 38 could be made as shown in FIG. 4a wherein the center layers 40 is formed by a film of paint or ink opaque to visible radiation 36 yet transparent to infra red radiation 28. Another film of paint or ink 41 opaque to infra red radiation is provided with holes 46 constituting the coded information. Both films coat the rigid outer layers 42 and 44 which are translucent so that only the infra red radiation may pass through the card where the holes 46 are located. Instead of the film 41 with holes 46 therein, dots opaque to infrared radiation could be printed on the card at appropriate locations.

Referring now to FIGS. 5, 7 and 8, it will be observed that the housing enclosure 12 includes a pair of a parallel spaced side walls 48 on which a pair of channel tracks 50 are mounted below an elongated slot 52. The tray member 18 includes a top portion 54 which extends laterally through the slots 52 terminating in a pair of downwardly depending side portions 56. Guide rollers 58 are rotatably mounted on the side portions 56 and are received within the channel tracks 50 in order to slidingly guide movement of the tray member rearwardly from the card receiving position shown in FIG. 5. The top portion 54 of the tray member includes therefore, a recessed opening 60 within which a credit card is received so that it may be displaced from the card receiving position rearwardly by manually pushing against the forward downwardly depending portion 62 of the tray member.

Connected to the downwardly and rearwardly sloping wall 64 within the housing enclosure 12, is a rearwardly extending flash housing 66 having a front closing wall 68. Mounted within the flash housing and supported between the side walls 48, is a flash lamp device 70 constituting a stationary source of radiation adapted to be ignited upon actuation of a rear micro switch 72 adapted to be connected to a source of energizing voltage. A switch actuating element 74 is therefore connected to the tray member 18 so that when it is manually displaced from the forward card receiving position shown in FIG. 5 to the card reading position shown in FIG. 6, the rear switch 72 will be actuated in order to ignite the flash lamp device 70. When ignited, the infra red radiation emitted from the lamp device 70 will pass through the infra red filter 76 forming the bottom wall of the flash housing 66. Therefore, in the card reading position of the tray member 12, the recessed opening 60 within which the credit card is carried, will be positioned below the flash housing. Positioned below the top portion 54 of the tray member is a circuit board mounting track 78 which extends rearwardly from the partition 80 secured to the bottom wall 82 of the housing enclosure. The circuit board mounting track 78 is adapted to mount a circuit board 84 as shown by dotted lines in FIGS. 5 and 6 on which photodetecting elements are mounted for exposure to the infra red radiation passing through the credit card being read. All of the coded information carried on the credit card is therefore simultaneously read into the device while the tray member 18 is held stationary in its card reading position.

The tray member is displaced from its forward card receiving position against the bias of a pair of spring elements 86 having opposite ends respectively anchored to anchoring brackets 88 secured to the front frame member 14 as shown in FIG. 5 and to the rear anchor elements 90 secured to the side walls 56 of the tray member as shown in FIG. 7. Also interconnecting the side portions 56 of the tray below the bottom wall 82 is a transverse rod 92 to which the forward end of a guide rod 94 is connected. A guide piston 96 is connected to the rod 94 and is guidingly received within a guiding cylinder 98 secured to the bottom wall 82. Also associated with the transverse rod 92, is a releasable latch mechanism generally referred to by reference numeral 100. As more clearly seen in FIG. 9, the releasable latch mechanism includes a pivotal mounting member 102 secured to the bottom wall 82 on which a latch element 104 is pivotally mounted. The forward end of the latch element includes a hook portion 106 adapted to engage the transverse rod 92 in order to hold the tray member in its card reading position as shown in FIG. 6. The latch element 104 is also connected by means of the link element 108 to the armature member 110 of a latch releasing solenoid 112. Interconnected between the solenoid armature 110 and the latch element 104, is a spring element 114, operative to yieldably hold the latch element in a downward position when the solenoid armature 110 is extended as shown in FIG. 5. Accordingly, rearward displacement of the tray member will cause the transverse rod 92 to cam the latch element upwardly when engaging the hook portion 106 and thereby be latched in the card reading position. The latch is released by pivotal displacement thereof to the position illustrated in FIG. 9 by retraction of the armature 110 upon energization of the solenoid 112. Accordingly, upon release of the latch element, the springs 86 will return the tray member to the forward card receiving position. The latch releasing solenoid 112 is therefore energized upon receipt of a command signal from the computer with which the credit card acceptor is associated.

When the tray member 18 is released for return to the card receiving position, one of the indicator lamps 20 and 22 is illuminated in order to indicate the credit condition of the person bearing the credit card being checked. Each of the indicator lamps as shown in FIG. 5 includes a bulb device 116 mounted rearwardly of a window 118 on which suitable indicia is mounted such as the words "ACCEPT" and "REJECT" shown in FIG. 3. Also mounted within the housing enclosure rearwardly of the wall 64, are a plurality of circuit board mounting tracks 120 adapted to receive printed circuit boards which mount the various electronic components associated with the credit card acceptor, for handling the coded information.

From the foregoing description, it will be appreciated that a plurality of credit card acceptor devices 10 could be associated with a credit checking computer so that the credit conditions of persons bearing credit cards may be checked against a "blacklist" from a plurality of different stations by means of a real time computer. Each credit card acceptor will therefore be associated with a computer 122 as diagrammatically shown in FIG. 1 which could also have a recorder 124 to provide a record of the credit checking operations. The information fed to the computer for checking purposes, is received from the readout circuit 126 associated with the credit card acceptor through a read-out line 128 after the computer has signalled the read-out circuit through transmit line 130 that it is ready to receive the information stored within the read-out circuit. After the computer has completed its credit checking operation, an output signal is fed to the read-out circuit and to the indicator component 116. Information is read into the read-out circuit 126 from a credit card 24 for example, the read-out circuit also being preset by sales information from an information presetting component 132 so as to limit operation of the read-out circuit 126 to information for which the computer 122 is programmed. Thus, when the credit card is displaced by the tray member 18 to the stationary card reading position, the information will be read into the read-out circuit by closing of the rear switch 72 connecting the flash lamp device 70 to a source of voltage 133 and setting a timing circuit 198 as diagrammatically shown in FIG. 10. The flash device operates for a predetermined interval after it is triggered. If the computer produces an accept signal at the completion of one operational cycle, the logic component 135 closes a vend switch 136 and completes an energizing circuit through line 137 for the latch releasing solenoid 112 and for lamp 20 through line 139. The card carrying tray member 18 may then return to the receiving position while the accept lamp 20 is illuminated in order to register the output of the computer. On the other hand, should the output of the computer be indicative of a bad credit condition in connection with sales information for which the computer is programmed, a reject switch 138 may close in order to complete an energizing circuit through the latch releasing solenoid 112 and illuminating the reject lamp 22. If the credit card is not authentic, the computer may request a re-check by resetting the logic component 135 causing the flash lamp 70 to re-ignite and re-transmit the coded information on the credit card to the computer during a predetermined delay period. At the end of the delay period, the component 198 completes a circuit for the latch releasing solenoid 112 to effect return of the card carrying tray member to the forward receiving position. Thus, operation of the device will be restricted to only authentic credit cards.

Referring now to FIG. 2, one example of a read-out circuit is shown containing 15 signal storing flip-flops or bistable multivibrators 140. A first group of 10 signal storing flip-flops 140 have their condition setting terminals connected by conductors 142 to the output elements of a plurality of phototransistor types of detectors 144. The other group of signal storing flip-flops have their condition setting terminals connected by diodes 146 to an input amplifier 148 through which the read-out circuit is preset by the sales information for which the computer is to be programmed. The reset terminals of all of the signal storing flip-flops 140 are connected to a reset line 150 so that they may be simultaneously reset to a condition for re-transmittal of information from either another credit card or the same card if not authenticated. The reset line 150 is connected to one of the outputs of a monostable multivibrator 152 switched to its unstable state for producing a reset signal in line 150 when triggered by either an accept or a reject signal supplied through the OR gate 154 from the computer.

Associated with each of the signal storing flip-flops 140, is an AND gate 156 having one input terminal thereof connected by a conductor 158 to one of the outputs of its associated flip-flop 140. Accordingly, when infra-red radiation is sensed by any of the photo transistors 144, a signal voltage will be supplied to an AND gate 156 in order to satisfy one-half of its threshold voltage. Similarly, any of the flip-flops in the second group set by sales information signals through the diodes 146, will satisfy one-half of the threshold voltage requirement of its associated AND gate 156. When the threshold voltage of any of the input AND gates 156 is satisfied, a signal pulse will be fed from its output 160 to the computer through the read-out line 128 connected to all of the outputs of the AND gates 156.

It will be apparent, that the signal storing flip-flops 140 and the AND gates 156 associated therewith will be operative to simultaneously store signal pulses in response to read-in of the coded information from the credit card. Also, the level of the amplified voltage supplied by the input amplifier 148 will be passed through selected diodes 146 to the flip-flops 140 in the second group in accordance with the sales information. The information so stored, will then be sequentially fed to the computer from the AND gates 156. However, before the signal pulses are fed to the computer, a ready signal is dispatched to the computer so as to indicate that information is available for transmission. Toward this end, one of the output terminals of each of the flip-flops 140 are connected by conductors 164 to a common voltage line 166 so that dependent upon the number of flip-flops 140 that have not been set by the photo transistors 144 and the voltages supplied through the diodes 146, a ready signal will be dispatched to the computer through the ready signal line 168. The ready signal line 168 is therefore connected to the output of a monostable multivibrator 170 connected to the common voltage line 166 through the gate 172 in order to trigger the monostable to its unstable state dispatching the ready signal through the ready signal line 168.

When the computer is ready to receive the information following receipt of the ready signal, the read-out control section of the circuit is set into operation by a transmit signal fed to the read-out circuit through the transmit signal line 130.

The transmit signal line 130 is connected to the set terminal of a bistable multivibrator 176 so that the transmit signal will be passed to one of the input terminals of the clock AND gate 178. The threshold voltage of the AND gate 178 is thereby satisfied so as to pass timing pulses from the clock source 180 to the binary counter 182 and to the computer through a synchronizing signal line 184. The counter 182 consists of four bistable multivibrators 186 interconnected in such a fashion that each timing pulse will switch a bistable from a "1" state to a "0" state without switching the following bistable while the bistable when switched from a "0" state to the "1" state will switch the following bistable. Accordingly, the reset terminals of the bistables 186 are interconnected by a reset line 188 while one of the output terminals of each bistable is connected to the set terminal of a following bistable by a connecting line 190. Thus, the four bistable multivibrators 186 of the counter will produce a binary output pattern corresponding to a complete sequence of fifteen timing pulses as depicted in the following chart:

|  | Bistable state | | | |
| --- | --- | --- | --- | --- |
|  | A | B | C | D |
| Timing pulses: | | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

The output of the counter bistables are connected to a common voltage line 192 so that a different voltage level will be established therein for each timing pulse within the sequence to sequentially satisfy each of the fifteen read-out AND gates 194. Accordingly, the output of each of the AND gates 194 is connected to one of the inputs of the input AND gates 156 in order to read out any signal stored by an associated signal storing flip-flop 140. Therefore, a signal pulse will be fed through the read-out line 128 to the computer from any of the flip-flops 140 that are set, these signal pulses being synchronized with corresponding timing pulses fed to the computer through the synchronizing line 184. At the end of a sequence of counting pulses, the output of the last AND gate 194 is fed through the reset line 196 to the reset terminal of the transmit bistable 176. Accordingly, upon completion of a sequence of timing pulses, the bistable 176 closes the AND gate 178 in order to terminate operation of the timing mechanism and stop feeding of signal pulses to the computer. Information may then be re-transmitted to the computer if the signal storing flip-flops 140 are not reset by any reset signals supplied thereto. Therefore, the credit card acceptor is reset for its next operation only if the credit card is accepted or rejected by the computer by dispatch of an accept or a reject signal to the OR gate 154. If card information read to the computer is not authenticated, the information will be re-transmitted as many times as desired, as determined by the delay component 198 for example aforementioned, before resetting of the device.

From the foregoing information, the construction operation and utility of the credit card acceptor of the present invention will be apparent. It will therefore be appreciated, that the credit card acceptor device of the present invention operates in a relatively rapid fashion because of the simultaneous read-in of all of the information on the credit card as well as the preset information regarding the sale price or type of purchase, followed by sequential read-out of the information to the computer in the form of signal pulses and corresponding timing pulses. In the example shown in FIG. 2, 15 bits of information are to be handled. In actual practice however, approximately 30 bits may be required so that the counter 182 must be correspondingly enlarged by two bistables to increase the count to thirty-one. The arrangement of the acceptor device for holding the card carrying tray member in the card reading position and release thereof when either an accept or a reject signal is received from the computer, therefore represent significant features of the invention. Further, the manner in which the coded information is placed on the credit card and read will prevent reproduction of the information by unauthorized persons.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A credit checking apparatus adapted to read a credit card and indicate the credit condition pertaining to the card comprising, in combination, a credit checking computer, a credit card having opposite sides and having infra red radiation transmitting portions defined therein at predetermined locations and having portions defined therein at predetermined locations opaque to infra red radiation, a credit card reading support receiving the card to be read, an infrar red flash lamp for emitting high intensity infra red radiation for a short time period disposed at one side of said reading support and at one side of said card as it is being read, infra red radiation photo transistor reading means disposed adjacent said card receiving infra red radiation transmitted by said card transmitting portions producing signal pulses in accord with the arrangement of the infra red radiation transmitting portions of said card, read-out control means connecting said reading means to said computer feeding said signal pulses to said computer, and indicator means registering output signals from the computer indicating credit.

2. The combination of claim 1 including preset means operatively connected to the reading means for rendering the computer operative only in response to the storage of signal pulses for which the computer is programmed.

3. The combination of claim 2 wherein said reading means compirses a plurality of signal storing flip-flops, a plurality of input AND gates respectively connecting the signal storing flip-flops to the read-out control means, a plurality of photosensing elements connected to one group of said signal storing flip-flops for setting thereof to one state by said signal pulses, another group of said signal storing flip-flops being connected to the preset means, resetting means connecting the computer to all of said signal storing flip-flops for simultaneous resetting thereof to the other state, and ready signalling means connected to all of said signal storing flip-flops for rendering the computer operative if a predetermined number of flip-flops remain in said other state.

4. In a credit checking apparatus as in claim 1 wherein said credit card infra red radiation transmitting portions comprise passages defined therein and said flash lamp and said reading means are disposed on opposite sides of said credit card and said reading support.

5. A credit checking apparatus adapted to read a credit card and indicate the credit condition pertaining to the card comprising, in combination, a credit checking computer, a credit card comprising an inner layer of material impervious to infra red radiation having a plurality of passages defined there on in a predetermined information indicating pattern through which infra red radiation may pass and rigid outer layers of material previous to infra red radiation disposed on opposite sides of said inner layer sandwiching said inner layer therebetween, a credit card reading support receiving the card to be read, an infra red flash lamp for emitting high intensity infra red radiation for a short time period disposed at one side of said reading support and disposed adjacent one of the outer layers of said card as it is being read, infra red radiation responsive reading means disposed adjacent said card receiving infra red radiaiton transmitted by said card transmitting passages producing signal pulses in accord with the arrangement of the infra red radiation transmitting passages of said card, read-out control means connecting said reading means to said computer, and indicating means registering output signals from the computer indicating credit.

References Cited

UNITED STATES PATENTS

| | | | |
|---|---|---|---|
| 2,903,596 | 9/1959 | Reed | 250—213 |
| 3,017,051 | 1/1962 | Rosenfeld | 270—71 X |
| 3,035,764 | 5/1962 | Beman | 235—61.9 |
| 3,179,810 | 4/1965 | Wadey. | |
| 3,184,714 | 5/1965 | Brown et al. | |
| 3,239,815 | 3/1966 | Martens. | |
| 3,279,826 | 10/1966 | Rudershavsen et al. | |
| 3,299,298 | 1/1967 | Schinner. | |
| 3,324,460 | 6/1967 | Leonard et al. | 236—61.7 X |
| 3,355,576 | 11/1967 | Childers et al. | 235—61.7 |
| 2,547,838 | 4/1951 | Russel | 235—61.12 |
| 3,092,402 | 6/1963 | Reed | 235—61.12 |
| 3,225,177 | 12/1965 | Stites et al. | 235—61.115 |
| 3,255,339 | 7/1966 | Ravsing | 235—61.7 |

DARYL W. COOK, Primary Examiner

R. M. KILGORE, Assistant Examiner

U.S. Cl. X.R.

235—61.11; 250—219; 340—149